United States Patent
Sherlock

(10) Patent No.: US 9,571,657 B2
(45) Date of Patent: Feb. 14, 2017

(54) SHARED VOICEMAIL SYSTEM

(71) Applicant: BRITISH TELECOMMUNICATIONS public limited company, London (GB)

(72) Inventor: Gerard Patrick Sherlock, London (GB)

(73) Assignee: British Telecommunications PLC, London (GB)

( * ) Notice: Subject to any disclaimer, the term of this patent is extended or adjusted under 35 U.S.C. 154(b) by 0 days.

(21) Appl. No.: 14/432,000

(22) PCT Filed: Sep. 20, 2013

(86) PCT No.: PCT/GB2013/000399
§ 371 (c)(1),
(2) Date: Mar. 27, 2015

(87) PCT Pub. No.: WO2014/049313
PCT Pub. Date: Apr. 3, 2014

(65) Prior Publication Data
US 2015/0244866 A1  Aug. 27, 2015

(30) Foreign Application Priority Data
Sep. 28, 2012 (EP) ................. 12250157

(51) Int. Cl.
*H04M 1/64* (2006.01)
*H04M 3/533* (2006.01)
(Continued)

(52) U.S. Cl.
CPC ..... *H04M 3/53333* (2013.01); *H04M 3/42238* (2013.01); *H04M 3/436* (2013.01);
(Continued)

(58) Field of Classification Search
CPC ................................ H04M 3/53333
See application file for complete search history.

(56) References Cited

U.S. PATENT DOCUMENTS

2004/0215748 A1  10/2004  Boonie et al.
2007/0269023 A1  11/2007  Klauer et al.
(Continued)

OTHER PUBLICATIONS

Extended European Search Report (5 pgs.) dated Mar. 4, 2013 issued in corresponding European Application No. 12250157.0.
(Continued)

*Primary Examiner* — Joseph T Phan
(74) *Attorney, Agent, or Firm* — Nixon & Vanderhye PC

(57) ABSTRACT

A shared voicemail system and method of operation in which the system comprises a computer processor configured in use to store a voice message received from a third party; in which the stored voice message is accessible to each user of a plurality of users of the shared voicemail system. The computer processor also configured in use to provide a copy of the stored message to a first user of the plurality of users, receive an indication from the first user that the message is intended to be accessed by a second user of the plurality of users and to provide a notification prompting the second user to access the message. In an embodiment, the voice message received from the third party is part of a call redirected to the shared voicemail system from a phone line shared by the plurality of users.

16 Claims, 5 Drawing Sheets

(51) Int. Cl.
  *H04M 3/42*     (2006.01)
  *H04M 3/436*    (2006.01)
  *H04M 3/537*    (2006.01)
  *H04M 3/54*     (2006.01)
  *H04M 3/58*     (2006.01)

(52) U.S. Cl.
  CPC ............. *H04M 3/537* (2013.01); *H04M 3/54* (2013.01); *H04M 3/58* (2013.01); *H04M 2203/2044* (2013.01); *H04M 2203/4545* (2013.01)

(56) References Cited

U.S. PATENT DOCUMENTS

| | | | |
|---|---|---|---|
| 2008/0200152 A1* | 8/2008 | Moore ................. | H04M 3/537 455/413 |
| 2010/0136980 A1 | 6/2010 | Linquist et al. | |
| 2010/0159967 A1* | 6/2010 | Pounds ................. | H04L 51/14 455/466 |
| 2011/0093544 A1* | 4/2011 | Yasrebi ................ | G06Q 10/107 709/206 |

OTHER PUBLICATIONS

International Preliminary Report on Patentability and Written Opinion of the International Searching Authority (8 pgs.) dated Mar. 31, 2015 issued in corresponding International Application No. PCT/GB2013/000399.
International Search Report for PCT/GB2013/000399, mailed Oct. 21, 2013.

\* cited by examiner

SHARED VOICEMAIL SYSTEM

This application is the U.S. national phase of International Application No. PCT/GB2013/000399, filed 20 Sep. 2013, which designated the U.S. and claims priority to EP Application No. 12250157.0, filed 28 Sep. 2012, the entire contents of each of which are hereby incorporated by reference.

TECHNICAL FIELD

The invention in certain example embodiments relates to voicemail systems for providing voicemail services shared by a group of users.

BACKGROUND AND SUMMARY

Voicemail is generally regarded as an application or service whereby a first telecommunications service subscriber (the calling party) initiates a call to a second telecommunications service subscriber (the called party) and the incoming call to the called party is diverted to a messaging service where information intended for the called party may be provided by the calling party and stored (e.g. in the form of a voicemail message) by the provider of the messaging service for the called party to access at a later date or time. The voicemail message is stored by the called party's voicemail system and is accessible to the called party on request.

The invention addresses shortcomings in conventional voicemail systems by way of a shared voicemail system comprising a computer processor configured in use to store a voice message received from a third party; in which the stored voice message is accessible to each user of a plurality of users of the shared voicemail system. The processor is further configured in use to provide a copy of the stored message to a first user of the plurality of users; receive an indication from the first user that the message is intended to be accessed by a second user of the plurality of users; and provide a notification prompting the second user to access the message.

Hence a notification is provided to alert the target destination of the voice message, although the message has already been accessed by another user. A typical voicemail system will mark the message as "read", once it has been accessed by a user.

A method of operating a shared voicemail system; the method comprising: storing a voice message received from a third party, in which the stored voice message is accessible to each user of a plurality of users of the shared voicemail system. The method further comprises providing a copy of the message to a first user of the plurality of users; receiving an indication from the first user indicating that the message is intended to be accessed by a second user of the plurality of users; and providing a notification prompting the second user to access the message.

In an embodiment, the voice message received from the third party is part of a call redirected to the shared voicemail system from a phone line shared by the plurality of users.

BRIEF DESCRIPTION OF THE DRAWINGS

In order to aid understanding, embodiments of the invention will now be described by way of example with reference to the drawings in which.

DETAILED DESCRIPTION

Figure 1:
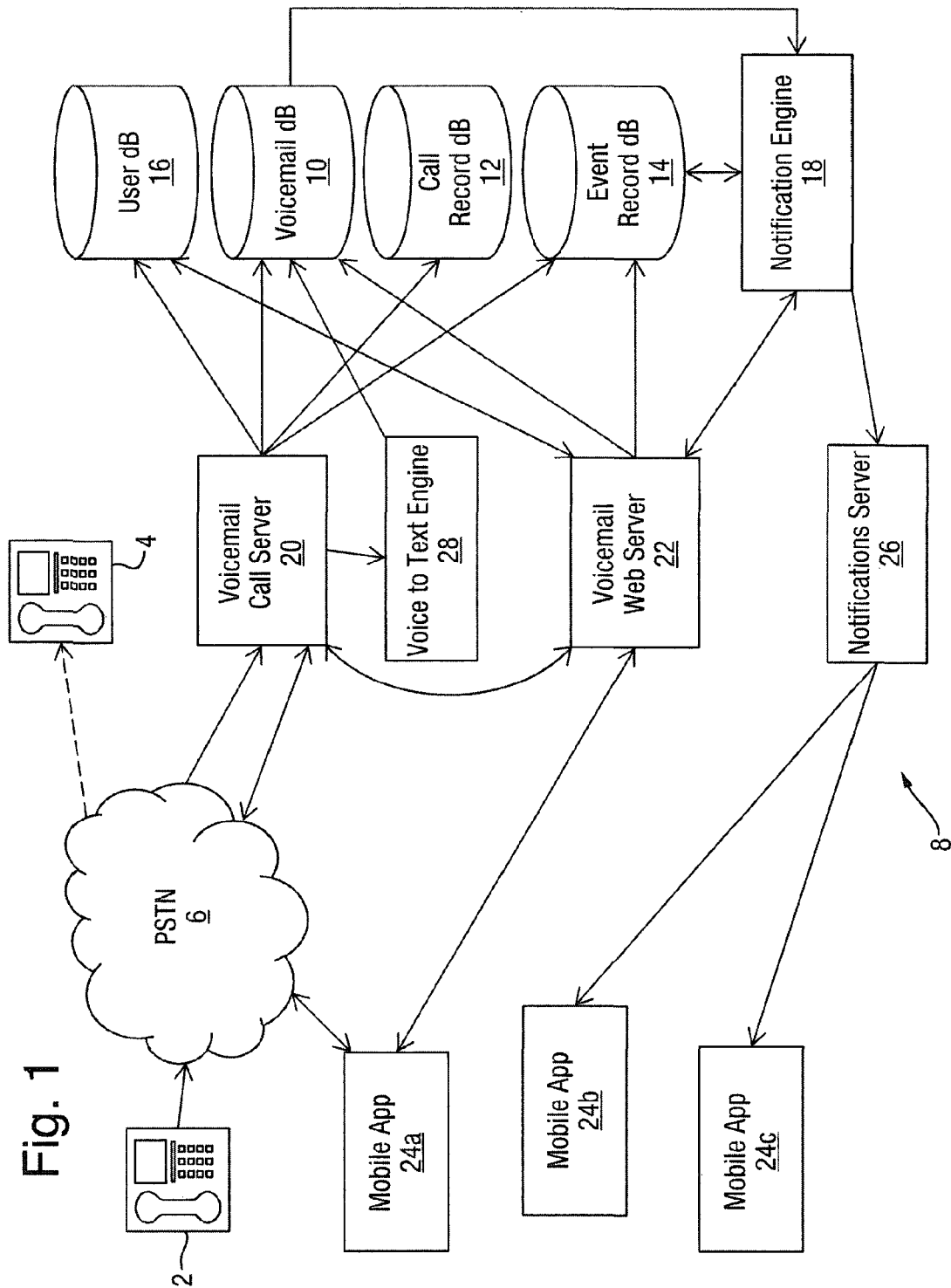
FIG. 1 shows in block diagram form, a system according to an aspect of the present invention.

According to a first embodiment, a phone line is accessible by and shared by a number of people. This could for instance be a landline in a household where inbound calls to the line in question could be intended for any member of the household. The concept of the shared phone line is also appropriate in the context of a small business, where a single phone line could be shared by a number of staff members.

The shared phone line has a voicemail service supported by a voicemail system associated with it, so that if a calling party calls the shared phone line, and there is no response, then the calling party will be redirected to the voicemail system to leave a voice message. The normal voicemail functions would apply to this service, e.g. the line may be set to forward all incoming calls to voicemail or forward to voicemail when the line is busy or on no reply.

The voicemail service is accessible by and shared by a group of people i.e. the people sharing access to tile shared phone line. It may be that the calling party wanted to talk to a particular user of the shared phone line, say Bob, and that the message they left is intended to be read by that particular user. However, with the shared voicemail system, any user may read the message left for Bob. Typically, any voicemail system will mark a message as "read", once it has been accessed by a user in the case of a shared voicemail system, this can cause problems, as the user for whom the message was intended may not access the message, once it has been accessed by another user and marked by the system as "read". According to certain example embodiments of the present invention, in such circumstances, Bob may be prompted to access the message, even though it has been previously accessed by another user.

At least some of the users with access to the shared phone line also have access to means, e.g. a voicemail application, that can access messages held by the voicemail system. This voicemail application may be a web based application or it might be an application that runs on a smart phone or another suitable device. A user with access to the shared phone line may download a voicemail application to their smart phone or another suitable device or alternatively run a browser to access a web-services portal. In the case of the web-services portal, the user identifies themself to the portal with a familiar name. They may also provide to the system an audio record of their name so that the system is able to insert their name into audio messages as part of a voice response (IVR) interface.

The users also notify the voicemail system that they are connected to the shared phone line. Notification of connection by a user with access to the shared phone line could take a number of forms, including use of a code that has been provided to the users of the shared phone line. The identification may also include the use of a technique where the user enters the shared phone number on a web portal or smartphone voicemail application, then the voicemail system calls the user on the shared phone with a PIN code. When the user answers the call, the voicemail system provides the PIN, e.g. by means of a voice announcement.

The user then enters the PIN into the voicemail application or the portal to verify that they have access to this line.

A voicemail application on a user's device will, during the sign-up journey for the user, allow the user to be uniquely identified, e.g. by the user inputting their familiar name. A user may be able to use their voicemail application from a number of different devices. Each of the devices that a user can use their voicemail application from may also be uniquely identified. For example Carol on her iPhone X with unique device ID Y is one possible recipient, as is Bob with Android Phone Z and unique device ID W, such as an IMEI.

Each voicemail message recorded by the shared voicemail system will be associated within the system databases with an indication of the message's status. According to certain example embodiments of the present invention, one or more of the following internal status indications are provided:

"for attention of <user name>"
"marked by <user name>"
"read by <user_name>"

Where <user_name> is a form of unique identifier, for use within the system, i.e. an identifier of one of the users with access to the shared voicemail system who has registered their user name during the sign-up journey.

According to a further aspect of the present invention, internal message status indicators may be enhanced to allow an indicator to be associated with an expiry time or a validity period, so that the indicator is automatically reset on reaching the allotted time. According to a further aspect of the present invention, an internal message status indicator may mark a voicemail message as "urgent" or "locked" (i.e. so that only one user may access the associated message). According to a further aspect of the present invention, internal message status indicators may, in addition, indicate the way in which message status is to be communicated with a user.

Each user of the shared voicemail system may configure their voicemail application or web portal to provide the user with notifications about the arrival at the voicemail system of new voicemail messages. The method of transmission of these notifications may vary and may be chosen by the user. Suitable methods include notification over SMS text message, notification by email, notification via the voicemail application polling information on the server, notification by a voicemail application push notifications server (e.g. 26 in FIG. 1), or notification by the voicemail platform calling the user.

According to a further aspect of the present invention, calling party interaction with the voicemail system proceeds as follows. A calling party dials the number of the phone line associated with the shared voicemail system. The calling party is diverted to the voicemail system and leaves a voice message. The message is stored in the voicemail database and a record is created of the "message left" event. According to a further aspect of the present invention, the voicemail message may also be processed by voice-to-text engine (e.g. 28 in FIG. 1). The resulting text-based version of the message may be stored with the audio voicemail message.

When there is a voicemail message that is unread or new to the mailbox then all users should see a notification that the mailbox has something new in it that requires attention. Each of the users of the shared voicemail system may receive a notification of a "message left" event, i.e. the status of the voicemail system notified to the group of users is now "message unread", "new message" or similar. The status may be notified to the users by the voicemail applications available to users. In addition, users may have access to a status indication for individual voicemail messages. Many smart phone voicemail applications, for example, could provide extra information appended to the application icon. A second indicator may be provided within the voicemail application itself. For example, there may be a list of current voicemail messages (e.g. 210-216 in FIG. 2*a*) that are associated with the shared voicemail system. Individual messages may have notifications appended to them.

Implementation

A system according to an aspect of the present invention will now be described with reference to FIG. 1. As shown in FIG. 1, a telephone call is initiated from a calling party's communications device 2 to a called party's communications device 4 via PSTN 6. PSTN 6 is shown by way of example only and should be understood to represent one or more telephone networks which may be fixed or mobile and may operate over standard TDM technology or voice over IP technology. The telephone call is not connected to called party's communications device 4 (as indicated by the dashed line) and is, instead connected to voicemail system 8.

Voicemail system 8 may, according to an embodiment, be implemented on a single server computer running a single voicemail software suite with a voicemail database associated with the voicemail software suite on the same server. Alternatively, the functions of the voicemail server may be distributed across a plurality of component computing elements. Either implementation may be used, however, for the purposes of clarity operation will now be described with reference to FIG. 1 in terms of a plurality of component computing elements. Details of a suitable computing element architecture are described, below, with reference to FIG. 4.

Voicemail Server Component Computing Elements.

Voicemail call server 20 handles inbound PSTN-like voice communications to the voicemail system. For example, calls received over a telephony or PSTN-like interface when those calls are forwarded to the voicemail system, so that the calling party can leave a message. Subscribers to the voicemail system can access voicemail system 8 to access messages left on their voicemail system and, using voice or button-press commands, change the status of a selected voicemail message. Voicemail database 10 stores audio (and possibly transcribed text) relating to a voicemail message and voicemail status indicators.

Voicemail web server 22 provides a communication interface to the voicemail system for voicemail clients, such as voicemail applications or web browsers.

Call Record Database 12 records audio interactions, whether deposit a voicemail message or retrieval of a voicemail message. Call Record Database 12 supports the inclusion of new fields to handle additional functionality according to embodiments of the present invention.

Voicemail Event Record Database 14 records changes to the state of each recorded voicemail message. The content comprises a number of new fields and/or field types according to the present invention, as detailed, below.

Voicemail user database 16 records information on users of the voicemail system, including but not limited to an association between each user and the shared phone line. It may retain a record of contact points (e.g. a phone number, email address, application UID, etc.) and access methods (e.g. web portal, application, voice session on phone line) that each of the users is capable of using for interacting with the voicemail system. Voicemail user database 16 also stores a unique ID associated in the voicemail system with each instance of a voicemail application on a user's device. According to an embodiment of the invention, the data structure on voicemail user database 16 allows for a user to use more than one instance of a voicemail application associated with a shared voicemail system.

Voicemail Notification Engine 18 looks for and reacts to the arrival of new voicemail messages on the voicemail server, or to a change in voicemail message status. Changes in voicemail message status are recorded in Voicemail Event record Database 14. Voicemail notification engine 18 will react to changes in status, will set message status indicators and will direct notifications server 26, as appropriate.

Voicemail Applications 24a-24c, e.g. a voicemail application that runs on a smart phone or another suitable device and can access messages held by the voicemail system. According to an embodiment, a web browser interacting with a web portal may be used as an alternative voicemail client to a voicemail application. Also a user may interact with the service using a telephony interface. For example, a user may pick up on the shared phone line, get audible notification that there are messages waiting and interact with the voicemail system using phone key button presses or voice commands. Similarly, a user may be able to interact with the voicemail system from a phone other than the landline phone by dialling into their shared phone line, entering a PIN and then interacting with the service using phone key button presses or voice commands.

As with the voicemail server, according to an embodiment, each of voicemail applications 24a-24c can be considered as a single component. Voicemail applications 24a-24c may be arranged to respond to "push notifications" or to SMS based text messages sent from a server and read by the user in the normal fashion.

Voicemail applications 24a-24c inform the user via a user interface (e.g. a GUI as shown in FIGS. 2a to 2f) about voicemail messages stored on their voicemail system. Voicemail applications 24a-24c may identify a calling party who left a voicemail messages by their phone number (e.g. 07700 349112) or, where contact recognition is supported; by 5 their name (e.g. "Mummy"). For contact recognition, a caller is recognized for example by recognizing the calling line CU—and information on the caller stored on the user's device is displayed to the called party. The user Interface displays the time of receipt and length of the voicemail message and the message status, I.e. "read", "new", etc.

Interaction between the user and the voicemail system is possible, in a number of ways. That is, the user may be able to play a voicemail message as a sound file (once it has been downloaded from the server), view a text transcription of a voicemail message (where this is supported) and call back the person who left the message (using the calling party's phone number acquired by the voicemail system).

According to certain example embodiments of the present invention, a user is able to mark a voicemail message on the 15 system in a number of different ways by use of status indicators. According to one embodiment, the status indicators may comprise:

New/Unread Message
Message read
Message for Attention of <user>
Message marked for attention of <user1> by <user2>

Further embodiments of the invention will now be described with reference to the FIGS. 2a-2f and 3.

Figure 2C:
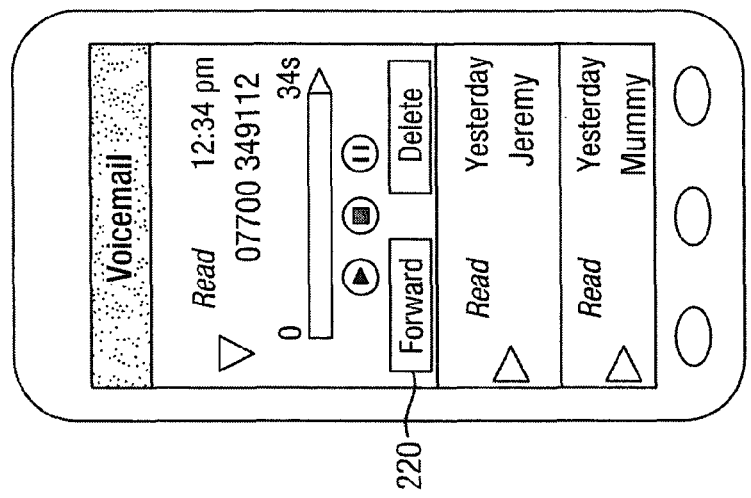
FIGS. 2a to 2f show representations of screen displays according to aspects of the present invention.
Figure 2B:
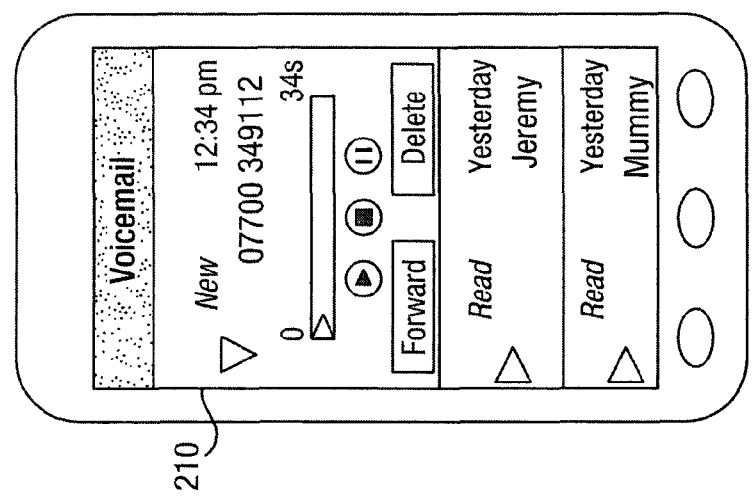
Figure 2A:
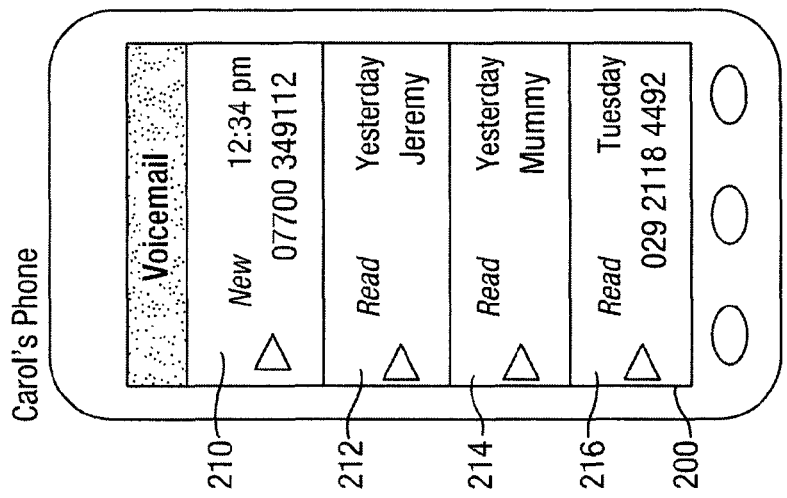

FIGS. 2a-2f show examples of displays on screens 200 of user devices (e.g. mobile phones) occurring at various points in the processing of a voicemail message according to an embodiment of the invention. FIG. 3 represents, in a flow diagram, a sequence of actions relating to the processing of the voicemail message according to an embodiment of the invention. The sequence of actions involves a calling party Alice (calling from a device allocated number 07700 349112) and a group of users, identified as Bob and Carol, of a shared voicemail system. User Alice leaves a voicemail message for user Bob on a shared voicemail system associated with a phone line shared between a number of users including Bob and Carol. FIGS. 2a to 2d show screen displays provided by a voicemail application running on Carol's phone. FIG. 2a shows the voicemail status display provided by Carol's voicemail application on screen 200 of Carol's phone. The voicemail status display comprises a number of different sections 210-216, each section displaying status information on a different voicemail message received by Bob and Carol's shared voicemail system.

Notification of the voicemail message left by Alice appears on screen 200 of Carol's phone at section 210 (FIG. 2a). Section 210 shows Alice's number and indicates the presence of a new voicemail message. Carol accesses the message via the voicemail application running on a mobile device not associated with the shared voicemail system. For example, Carol may access Alice's voicemail message by selecting, using known techniques such as tapping or clicking, the part of screen 200 occupied by section 210. In response to Carol selecting Alice's voicemail message, Carol's voicemail application changes the display (FIG. 2b) to focus on Alice's voicemail message and provide additional controls relating to playing the message, such as: play, stop and pause buttons and additional information, such as a playback progress bar. In addition, Carol's voicemail application provides in the display additional controls such as buttons for initiating forwarding and deleting of Alice's message. Carol listens to the message, as indicated by the updated playback progress bar shown in FIG. 2c, and realizes that the message is intended for Bob. Carol selects "forward" control button 220. In response to selection of "forward" control button 220, Carol's voicemail application again changes the display, this time shading or blanking out most of screen 200 and overlaying it with a menu 225 prompting Carol to select a recipient for the forwarded message from a list of the other users with access to the shared phone line. From the list, Carol selects Bob as the recipient in response to selection of Bob as the recipient, the voicemail system marks the status of Alice's message as intended for Bob.

Figure 2F:
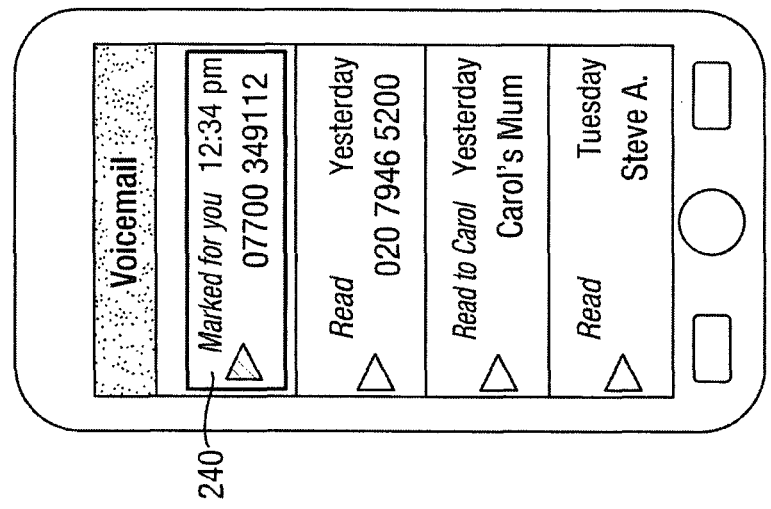
Figure 2E:
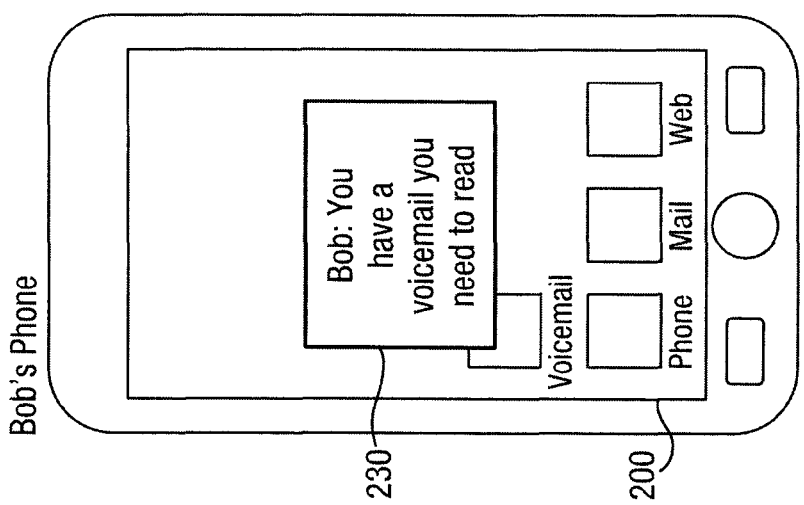
Figure 2D:
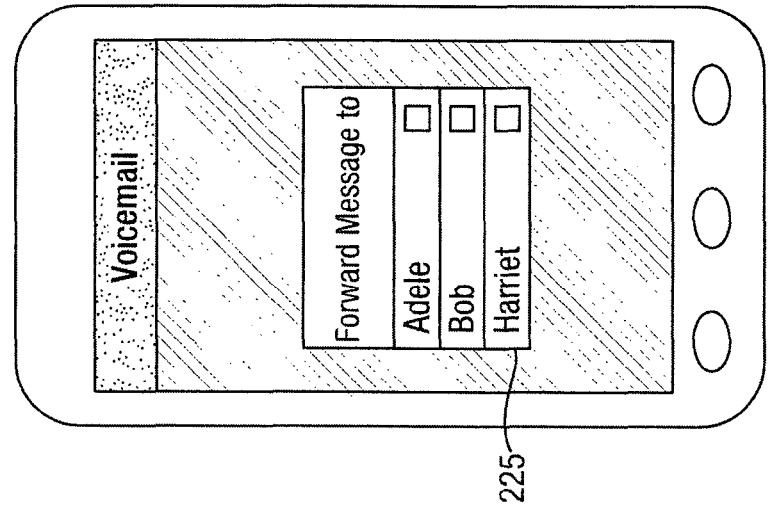
Figure 3:
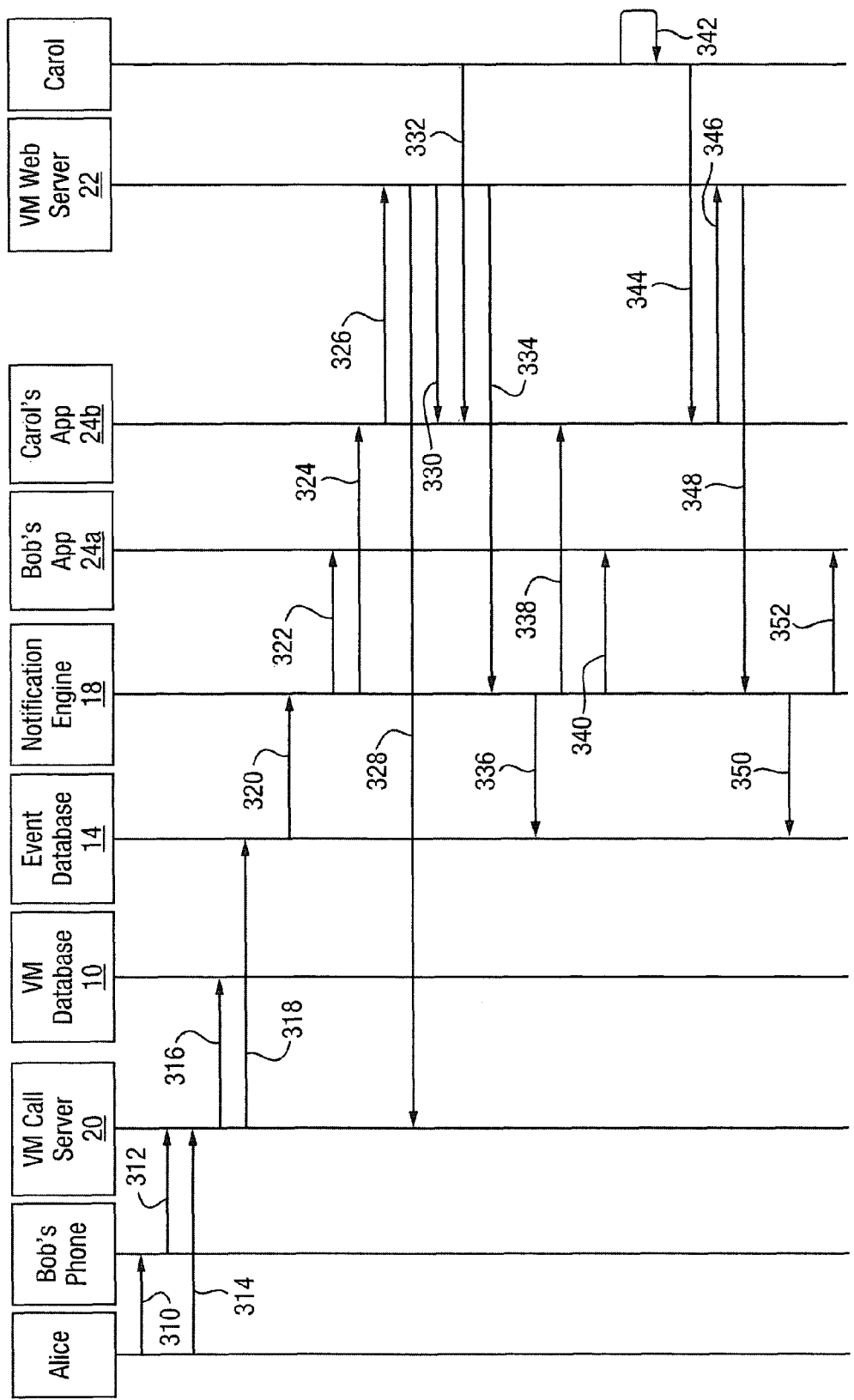
FIG. 3 shows a representation of signal flows according to an aspect of the invention.

FIGS. 2e and 2f show screen displays provided by a voicemail application running on Bob's phone. At FIG. 2e, Bob's voicemail application receives notification of the status change indicating that Bob has been selected as the recipient of the message and displays on screen 200 of Bob's phone notification 230 indicating that there is a new voicemail message specifically for him. Bob can access the voicemail status display provided by Bob's voicemail application, for example, by selecting the part of screen 200 occupied by notification 230. In response to selection of notification 230, Bob's voicemail application changes the display to show (FIG. 2f) the status of recent voicemail messages received by Bob and Carol's shared voicemail system and, in particular, to show at section 240 of screen 200 details of Alice's message with the indication "Marked for you", or similar. Bob may access Alice's voicemail message by selecting, using known techniques such as tapping or clicking, the part of screen 200 occupied by section 240. In response to selection by Bob of Alice's message, Bob's app 24a may provide Bob the opportunity to listen to the message in a similar way to that described above in relation to FIGS. 2b and 2c.

We now describe the sequence of actions in more detail with reference to FIG. 3.

Alice attempts to call 310 Bob on the shared phone line. Alice's call is forwarded 312 (e.g. via PSTN 6) to voicemail call server 20 and Alice records 314 a voicemail message. Voicemail call server 20 stores 316 a copy of Alice's message on voicemail database 10 and updates 318 Voicemail Event Record Database 14 regarding the new message event. Voicemail Event Record Database 14 sends 320 a "notify" command to notification engine 18, which sends 322, 324 a notification to the voicemail application 24a, 24b of each of users Bob and Carol.

Carol accesses (for example: listens to or reads) the content of the voicemail message. In more detail, Carol's app 24b (i.e. a voicemail application running on one of Carol's devices) sends 326 a "get message" command to voicemail web server 22. In response to receipt of the "get message" command, voicemail web server 22 sends 328 a "get message" command to voicemail call server 20 identifying the specific voicemail message required. Voicemail call server 20 responds 328, providing voicemail web server 22 with a copy of the requested voicemail message, which voicemail web server 22 forwards 330 to Carol's voicemail application 24b. Carol is then able to interact 332 with voicemail application 24b so as to access the voicemail message.

Voicemail web server 22 typically now marks 334 the voicemail message as "read" on notification engine 18. In response, notification engine 18 marks 336 the voicemail message as "read" on event record database 14 and updates 338, 340 the status of the voicemail message on Bob and Carol's portal or voicemail apps 24a, 24b.

User Carol, who has accessed the voicemail system realises 342 that the voicemail message is intended for, or of interest to Bob—another of the shared voicemail system users. Carol interacts 344 with her portal or voicemail app 24b to issue a request 346 to voicemail web server 22 to additionally mark the voicemail message as "for the attention of <user_name>" or similar phrase to encourage <user_name> to access the message, where "<user_name>" is the user name registered for Bob. According to a further aspect of the present invention, Carol can also mark the voicemail message as "urgent".

Voicemail web server 22 receives the request from Carol's portal or voicemail application 24b and instructs 348 notification engine 18 to record that the message is for Bob's attention. In response, notification engine 18 marks 350 the voicemail message as "for Bob's attention" or similar, on event record database 14 and updates 352 the status of the voicemail message on Bob's portal or voicemail app 24a accordingly.

On Bob's portal or voicemail applications 24a, the status of the marked voicemail message is changed to "message for Bob", "for the attention of Bob" or something similar and, optionally, as urgent. According to a further aspect of the present invention, where a voicemail message is marked "urgent", the voicemail system may respond by employing more than one method of notification to improve the likelihood that the targeted user receives the notification promptly. For example SMS text message may be sent to the user in addition to the notification described above.

According to a further embodiment, once Bob has accessed the voicemail message marked for Bob's attention, the status of the voicemail message will be changed on the portal or on their voicemail application to remove the "for the attention of Bob" indication. The voicemail system will record the status for the message as "read", for all users, unless Bob changes the notification to one of the other options.

Figure 4:
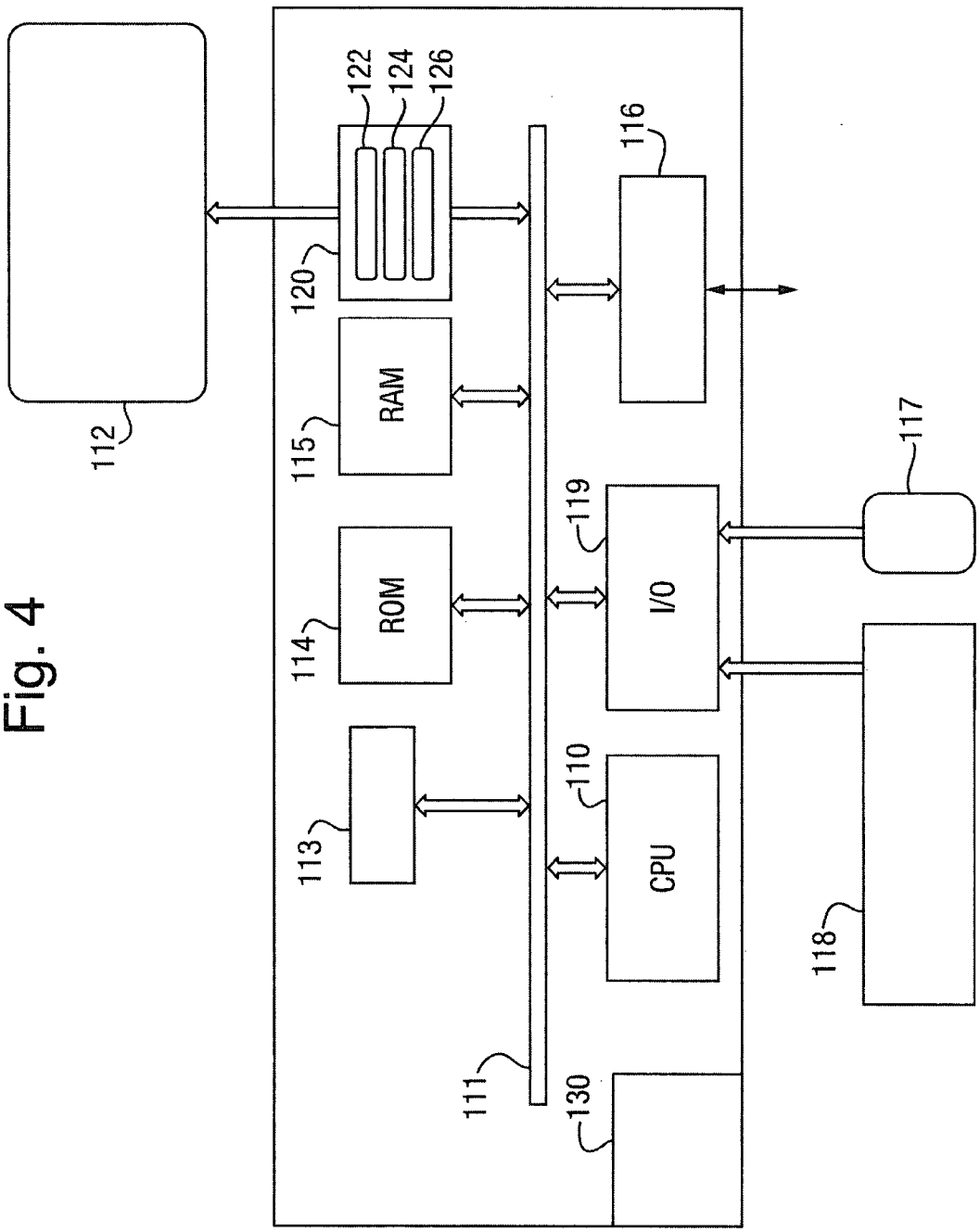
FIG. 4 shows a schematic of typical computer processor apparatus architecture on which software implementing aspects of the invention can be run.

A typical architecture for computer processor apparatus on which software implementing aspects of the invention can be run, is shown in FIG. 4. Each computer apparatus such as voicemail system 8, its components and user devices, comprises a central processing unit (CPU) 110 for executing computer apparatus software code and managing and controlling the operation of the computer apparatus. In the typical architecture, CPU 110 is connected via bus 111 to a variety of functional blocks including non-volatile data storage means. The non-volatile data storage means may comprise one or more disc drives 120. In addition there may be provided removable non-volatile data storage means, such as disc drives with removable media and solid state memory devices including non-volatile ROM 114 and volatile RAM 115.

The computer apparatus further includes one or more network interface 116 for interfacing to and exchanging data via one or more network (not shown) such as IP and telephony networks underpinning the various connections shown in FIG. 1.

The computer apparatus can also, optionally, include user input/output devices such as a pointer device 117 and keyboard 118 connected to bus 111 via input/output port 119, as well as a display 112. The computer apparatus is powered by power supply unit 130, typically obtaining power from an external power grid or internal battery (not shown). The skilled person will understand that this architecture is not limiting, but is merely an example of typical computer apparatus architecture. The computer apparatus may also be a distributed system, comprising a number of computer apparatuses communicating through their respective interface ports 116 such that a user may access program and other data stored on a remote computer apparatus using user input/output devices 112, 117, 118 on their local computer apparatus.

In the typical architecture, non-volatile data storage means 120 comprises an operating system 122 and one or more application programs 124. Non-volatile data storage means 120 further comprises computer apparatus code 126 which can be executed in order to perform a method according to aspects of the present invention, for example such as the one described above and illustrated in the drawing.

As will be understood by those skilled in the art, aspects of the invention may be implemented in computer program product software, any or all of which may be contained on various storage media so that the program can be loaded onto one or more computing devices (such as shown in FIG. 1) or could be downloaded over a computer network using a suitable transmission medium.

The above embodiments are to be understood as illustrative examples of the invention. It is to be understood that any feature described in relation to any one embodiment may be used alone, or in combination with other features described, and may also be used in combination with one or more features of another of the embodiments, or any combination of the embodiments. Further embodiments of the invention are envisaged and will be evident to the skilled reader. Furthermore, equivalents and modifications not described above may also be employed without departing from the scope of the invention, which is defined in the accompanying claims.

The voicemail server may have a web front end, and also have machine addressable APIs that may be consumed by a voicemail application.

The invention claimed is:

1. A shared voicemail system comprising a computer processor configured in use to:
   store a voice message received from a third party, wherein the stored voice message is accessible to each user of a plurality of users of the shared voicemail system;
   provide a copy of the stored message to a first user of the plurality of users;
   receive an indication from the first user that the message is intended to be accessed by a second user of the plurality of users; and
   provide a notification prompting the second user to access the message,
   wherein the plurality of users share a phone line, and
   wherein the voice message is received from the third party as part of a call to the shared phone line redirected to the shared voicemail system.

2. The shared voicemail system as claimed in claim 1, wherein the indication indicates that one of the first user and the third party intends the message to be accessed by the second user.

3. The shared voicemail system as claimed in claim 1, wherein the processor is configured in use to notify the second user that the indication was received from the first user.

4. The shared voicemail system as claimed in claim 1, wherein the processor is configured in use to mark the stored message with an indication that the message is intended to be accessed by the second user.

5. A shared voicemail system comprising a computer processor configured in use to:
   store a voice message received from a third party, wherein the stored voice message is accessible to each user of a plurality of users of the shared voicemail system;
   provide a copy of the stored message to a first user of the plurality of users;
   receive an indication from the first user that the message is intended to be accessed by a second user of the plurality of users;
   provide a notification prompting the second user to access the message; and
   provide the second user with a copy of the message in response to receiving from the second user a request for access to the message,
   wherein the plurality of users share a phone line, and
   wherein the voice message is received from the third party as part of a call to the shared phone line redirected to the shared voicemail system.

6. The shared voicemail system as claimed in claim 1, wherein the processor is configured in use to delete a copy of the indication held on the shared voicemail system upon providing to the second user a copy of the message.

7. The shared voicemail system as claimed in claim 1, wherein the shared voicemail system is associated with the phone line shared by the plurality of users.

8. A method of operating a shared voicemail system comprising a computer processor, the method comprising:
   storing a voice message received from a third party, wherein the stored voice message is accessible to each user of a plurality of users of the shared voicemail system;
   providing a copy of the message to a first user of the plurality of users;
   receiving an indication from the first user indicating that the message is intended to be accessed by a second user of the plurality of users; and
   providing a notification prompting the second user to access the message,
   wherein the plurality of users share a phone line, and
   wherein the voice message is received from the third party as part of a call to the shared phone line redirected to the shared voicemail system.

9. The method as claimed in claim 8, wherein the indication from the first user indicates that one of the first user and the third party intends the message to be accessed by the second user.

10. The method as claimed in claim 8, further comprising notifying the second user that the indication was received from the first user.

11. The method as claimed in claim 8, wherein provision of the notification comprises sending the notification to the second user using more than one means of communication.

12. A method of operating a shared voicemail system comprising a computer processor, the method comprising:
    storing a voice message received from a third party, wherein the stored voice message is accessible to each user of a plurality of users of the shared voicemail system;
    providing a copy of the message to a first user of the plurality of users;
    receiving an indication from the first user indicating that the message is intended to be accessed by a second user of the plurality of users;
    providing a notification prompting the second user to access the message; and
    following provision of the notification to the second user, receiving a request from the second user for access to the message and, in response the request from the second user, providing the second user with a copy of the message,
    wherein the plurality of users share a phone line, and
    wherein the voice message is received from the third party as part of a call to the shared phone line redirected to the shared voicemail system.

13. The method as claimed in claim 12, further comprising upon providing the second user with a copy of the message, deleting a copy of the indication held on the shared voicemail system.

14. The method as claimed in claim 8, further comprising receiving a request from the first user for access to the stored message and providing a copy of the stored message to the first user in response to the request.

15. The method as claimed in claim 14, further comprising, upon providing the first user with a copy of the message, marking the message as accessed.

16. The method as claimed in claim 8, wherein the shared voicemail system is associated with the phone line shared by the plurality of users.

* * * * *